Nov. 6, 1962 M. R. GEROW 3,061,875
WIND-UP METHOD AND APPARATUS
Filed Oct. 17, 1955 4 Sheets-Sheet 1
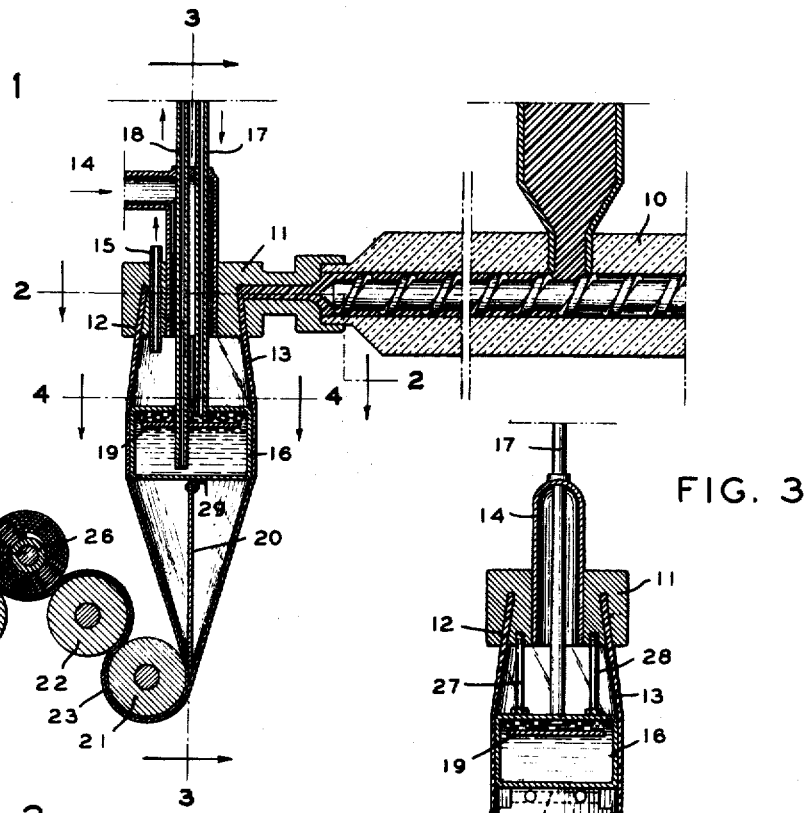
FIG. 1
FIG. 2
FIG. 3
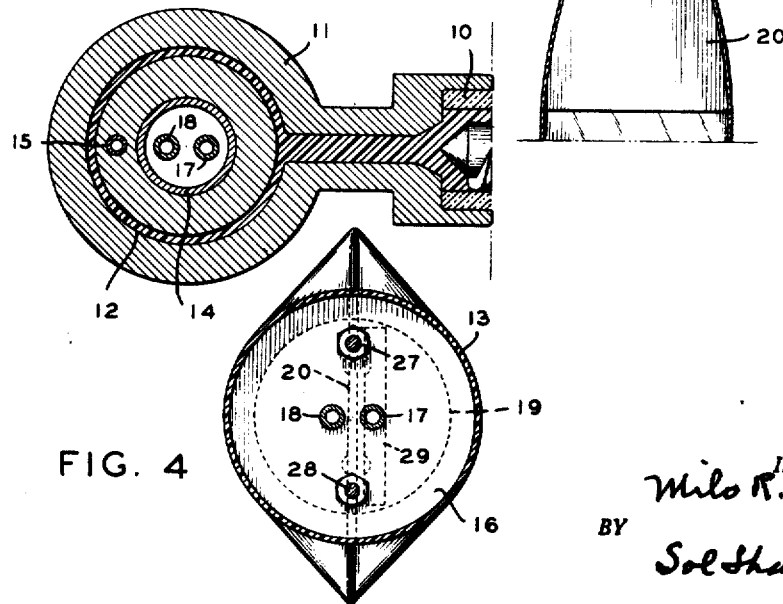
FIG. 4
INVENTOR.
Milo R. Gerow
BY Sol Shapiro
ATTORNEY Nov. 6, 1962 M. R. GEROW 3,061,875
WIND-UP METHOD AND APPARATUS
Filed Oct. 17, 1955 4 Sheets-Sheet 3

INVENTOR.
Milo R. Gerow
BY
Sol Shapiro
ATTORNEY

Nov. 6, 1962  M. R. GEROW  3,061,875
WIND-UP METHOD AND APPARATUS
Filed Oct. 17, 1955  4 Sheets-Sheet 4

INVENTOR
MILO R. GEROW
BY Sol Shapiro
ATTORNEY

United States Patent Office 3,061,875
Patented Nov. 6, 1962

3,061,875
WIND-UP METHOD AND APPARATUS
Milo R. Gerow, 74 S. Mountain Ave., Montclair, N.J.
Filed Oct. 17, 1955, Ser. No. 540,719
10 Claims. (Cl. 18—14)

This invention relates to methods and machines for producing tubing and sheeting particularly from thermoplastic materials and is more particularly directed to the production of thin-walled continuous seamless tubing or sheeting of predetermined characteristics from thermoplastic organic materials. This specification is a continuation-in-part of application Serial No. 274,192 filed February 29, 1952, now Patent No. 2,700,680 granted October 18, 1955.

Considering prior art methods and machines for the production of plastic films in use today they may be referred to generally as of the calendering, casting, and extrusion type.

Calendering is the most commonly used equipment today, mainly because it is an outgrowth of the rubber industry. Installations are quite expensive, a complete installation for calendering representing a cost of between $500,000 and $750,000 depending on the size calender and the auxiliary equipment required. A typical line includes a large Banbury, a two-roll pre-heating mill and a 4-roll calender and re-wind. The steam required for the Banbury, the two-roll mill and the calender, is of fairly large volume and must reach a temperature of at least 375° F. In normal operation there are generally required at least six men and more likely eight men for the necessary controls. Most of the calenders in operation produce at the rate of 50 yards of vinyl film per minute (the vinyl type polymer may be used as exemplary generally of the operations in actual use), while the newer calenders claimed to produce up to 100 yards per minute of a maximum width of 72 inches.

Limitations and deficiencies to some extent at least, in calender produced products involve the following:

(1) Minimum gauge 3 mil—some down to 2 mil
(2) Poor physical properties:
  Tensile _____ 2300
  Tear _____ 250
  Elongation _____ High
(3) High plasticizer ratio required for example 50 to 70 parts per 100 parts of vinyl resin. Consequently all calender film, if produced from smooth polished rolls, would block, and therefore the rolls on the calenders are matted, etched or frosted to produce a film with matted finish.
(4) Poor gauge control—.001" for 3 mil and 4 mil stock.

Since calenders are never able to really melt the compound, but only handle it in the formative mastic state, they are unable to obtain low gauge, transparent films or films with high physical characteristics. (The term "formative mastic state" is used herein to define that state of the plastic wherein the plastic is in the soft unset or partly set condition and can be permanently enlarged as by stretching.)

Good quality calendered film sells around 60¢ per pound in 3 and 4 mil gauges or around 13 to 15¢ per square yard or 10 to 12¢ per 1000 square inches. Production according to U.S. Tariff Commission is about 15,000,000 pounds of vinyl film per month all but about 250,000 pounds now being produced by calendering. Most calender films whether unsupported or supported by cloth or paper, are used for shower curtains, draperies, rain coats, leather type products such as handbags, luggage, artificial leather, etc. Many yards are embossed in the same operation.

Cast film is produced today in this country by the use of endless, stainless steel bands (360 feet long) or on a specially treated paper band of approximately 1500 feet in length. Cost of installation is around $50,000. The composition used in the production of film on stainless steel bands ranges about 40 parts of plasticizer to 100 parts of resin, the word compound used in this connection being illustrated by polyvinyl compositions containing the polyvinyl, plasticizer, lubricants, stabilizers, and pigments or dyes. In the materials used on the stainless steel bands the range in composition is about 40 parts of plasticizer to 100 parts of resin. The bands may be polished or matted. Material produced in this way is used for transparent window glass clear film while the matted band will duplicate the same type of product as that obtained by calendering operations. Five men are usually required to handle the operation.

The compounds used for casting on a paper web, range from about 40 parts of plasticizer to 100 parts of resin. The paper being rough gives the matted effect obtained from a calender. The limitations on casting operations include the following:

(1) Lowest gauge—1 mil
(2) Bad gauge variation
(3) High cost because of solvents used and not recovered
(4) Paper web cannot produce transparent film at present time.

Cast film sells for a price of about 75¢ to $1.30 per pound specifically 1 mil at $1.00 or 6.6¢ per square yard or 5¢ per 1000 square inches. The physical properties are generally better than that possessed by calendered film up to approximately double the values of the latter as follows:

Tensile_____ 2000 to 8000 p.s.i.
Tear_____ 10 to 1400 Elmendorf, gms.
Elongation_____ 2 to 350%.

Approximate production today of cast film is 250,000 pounds per month of polyvinyl.

Considering extruded film, this developed from operations in the rubber industry. Insofar as vinyl tubing or sheeting is produced by extrusion today, there has been only one manufacture but many producers of polythene tubing and sheeting have appeared in recent years.

Cost of installation of a production unit of this type is about $25,000 which includes mixer, extruder, and re-wind requiring a maximum of one operator to three machines and one compounder. Production depends on the size tubing and size extruder used. An extruder is capable of producing all gauge material which can be manufactured by the calendering operation and can produce material of much lower gauge than that produced by calendering. The same is true in comparing an extruder with the casting operation. Comparative physical properties for extruded material is the following.

Tensile_____ 3400 to 4400.
Tear_____ 300 to 700.
Elongation_____ As low or as high as desired.

Much greater flexibility is possible in formulation, gauge, and clarity by extrusion than by the other methods, and physical properties may be maintained even as the gauge is lowered. Extruded films produced to have the appearance of cellophane (now produced to an amount of about 320,000,000 pounds per year) in 0.0005 inch gauge will sell at $1.00 to $1.50 per pound or 2½¢ to 3¾¢ per 1000 square inches. Vinyl will of course give better package shefl life than cellophane. Cellophane cannot be heat sealed but must be coated with a heat seal coating. As indicated, extrusion can produce very thin gauge film and by methods hereinafter set forth it has been possible to produce film as low as 0.000125 inch materials.

Among the objects of the present invention is to provide new and improved methods and machines for producing very thin to thick walled continuous seamless tubing from a melt of thermoplastic organic material which tubing may be maintained as a tube or slit to produce sheeting.

Another object is the production of thin to thick walled continuous seamless tubing or sheeting, the final product being free from wrinkle, tracks and side-slip.

Other and further objects of the present invention will appear from the more detailed description set forth below, it being understood that such more detailed description is given by way of illustration and explanation only and not by way of limitation, since various changes therein may be made by those skilled in the art without departing from the scope or spirit of the present invention.

In connection with that more detailed description there is shown in the accompanying drawing in FIGURE 1, a side elevation partly in section of an apparatus that may be employed in carrying out the present invention; in FIGURE 2, a transverse cross-section of the apparatus of FIGURE 1 on the line 2—2; in FIGURE 3, a longitudinal cross-section of the apparatus of FIGURE 1 on the line 3—3; in FIGURE 4, a transverse cross-section on the line 4—4 of FIGURE 1; in FIGURE 5, an enlarged longitudinal cross-section through the former and die and associated parts; in FIGURE 6, a longitudinal cross-section through a further modification; in FIGURE 7, a longitudinal cross-section through the former and associated spreader; in FIGURE 8, a similar section showing a modified form of spreader; in FIGURE 9, a longitudinal section through a further modified form; in FIGURE 10, an elevation of a combined spreader and gussetting attachment partly in section; in FIGURE 11, a side elevation of the device of FIGURE 10; and in FIGURE 12, a perspective view of gusseted tubing.

Figure 5:
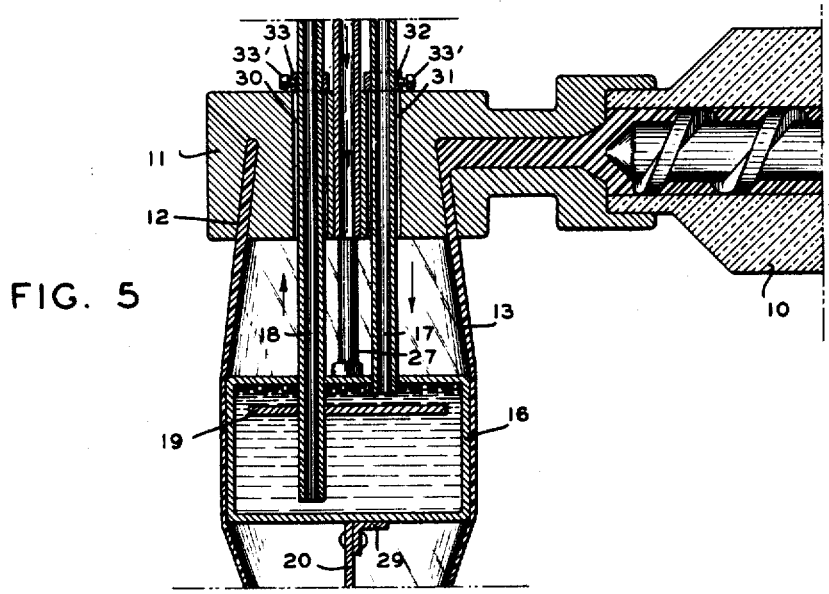

In accordance with the present invention, dry extrusions of a thermoplastic organic material from a melt is carried out by extrusion of heated thermoplastic to produce seamless tubing in non-self sustaining condition, such tubing being drawn from the die and while it is in the formative mastic state over a temperature modifying former to a predetermined diameter and setting the expanded tubing at the exact point where said tubing has reached the desired final diameter.

The drawing of the tubing from the die is carried out by utilization of pull rolls which also serve to remove any air since the tubing has been collapsed into the form of a ribbon or similar flattened shape before reaching the pull rolls. This is accomplished by the tubing passing over a spreader before reaching the pull rolls. Where the tubing is to be converted into a sheet, a slitter may be utilized before the tubing enters the pull rolls to form one or many sheets of desired width. The tubing or sheet whichever form produced may be taken up on wind-up reels as desired. The pull rolls may be driven at any desired speed to maintain the tubing under the desired tension while the tubing is in the formative mastic state thus controlling the physical properties of the tubing. Hence the peripheral speed of the pull rolls must be adjustable so that in combination with other controllable variables of the process, tubing or sheeting of the desired predetermined characteristics may be produced.

Since the thermoplastic is extruded in non-self sustaining condition, it is necessary to support such extruded tubing until it passes over the former and becomes set. For support of the tubing at this time, a gaseous medium is introduced within the tubing between the extrusion die and the cooling or temperature modifying former. The gaseous medium thus introduced is desirably of low pressure so that it just supports the plastic at this time. For introduction of the gaseous medium, the die or other portion of the extruding apparatus is provided with a conduit opening into the extruded tubing as the latter is being produced, so that the supporting fluid may be introduced to the tubing through such conduit and a vent in said die is provided from within the tubing whereby a supporting medium may be circulated into and out of the tubing. The pressure and volume of the gaseous medium is selected so that the extruded tubing while still in the formative plastic stage, will be supported and separated as it is expanded and passes over the former where it is produced of the predetermined diameter desired. Preferably the amount of air is that flow at which the tubing makes a substantially straight line between the die lips and the perimeter of the former. Actually the method may be operated with practically no air, but the physicals of the film are changed and volatiles would not be removed. The amount of air is one of the factors balanced with other factors such as temperature, extent of cooling desired, the extent of draw desired on the former, or below the former, etc.

The position of the former or its distance from the die also affects the physical properties of the film constituting the tubing and may therefore be correlated with the other variables to produce tubing or sheeting of the desired characteristics. The distance of the former from the die will therefore vary for particular circumstances, and will usually be judged by the condition of the mastic tubing. If the distance traveled between the die and the former is such that the tubing would cool below the formative mastic state, some means to maintain the formative mastic state may be used. A protective conduit or cover surrounding the tubing may be sufficient; or external heat may be applied, or both expedients may be used. In general, a distance of from 15 to 20 inches is usually the maximum unless some precaution against chilling is employed, while the former may be as close to the die as desired and even made a part thereof.

The final diameter of the tubing is obtained in the vicinity of the former or in the vicinity of the draw or pull rolls depending on the operating conditions. In either embodiment when the tubing is in the formative mastic state and has attained the desired diameter, the thermoplastic is set, that is, it is converted to that state which resists further drawing or expansion. The final diameter of the tubing is not dependent on the gaseous medium introduced for support, but depends upon the predetermined diameter of the former, the temperature of the former and its distance from the die.

In the most desirable form of the invention, the tubing is converted from the formative mastic state to the set condition by drawing the thermoplastic over the former of predetermined size. The gaseous medium which was introduced within the tubing for its support and flows continuously inside the tubing, not only assists in expansion of the tubing but starts the cooling of the tubing from the formative mastic state to the set state and also performs the function of carrying out volatile matter which may be formed during the heating of the thermoplastic and aids in its removal from within the tube when the gaseous medium is withdrawn through the vent in the die. The control of the temperature, pressure and volume of gaseous medium introduced into the tubing through the die aperture and subsequently vent, can affect, within narrow tolerances, the flat width and wall thickness of the finished tubing. It also permits control to a greater degree by its use, the structural characteristics of the tubing (orientation). The use of the combination of the circulating gaseous medium with the temperature modifying former enables control of the time period between the formative mastic state and the set state and such time period may be very short if desired by control of the temperatures of the gaseous medium and the former. But temperature of the gaseous medium is one of the factors which is balanced with others such as its volume, the extent of cooling desired, etc. Much depends on the formulation being extruded, its tackiness when hot, lubricants present and the base material. In this way it is possible to produce tubes or sheeting of any desired gauge as for example very low gauge of the order of .000125 inch.

In the manufacture of thermoplastic tubing and sheeting by this invention, the following dimensions and properties of the finished tubing and sheeting are capable of variation and may be controlled.

(1) Flat width of tubing and sheeting.
(2) Thickness of tubing and sheeting.
(3) Machine—direction properties: structural characteristics of the tubing and sheeting (i.e. tear resistance, tensile strength, etc.).
(4) Transverse—direction properties: structural characteristics of the tubing and sheeting (i.e. tear resistance, tensile strength, etc.).
(5) Clarity mainly due to the individual characteristics of the thermoplastic affected.

Referring to the apparatus illustrated in the drawings, the extruder 10 which may be jacketed for a temperature controlling medium in the usual way, extrudes the thermoplastic material through the die 11 out of orifice 12 through which the molten or semi-molten mass emerges in hot thermoplastic condition in the form of tubing 13 in non-self-sustaining condition at this time. The die is provided with a passage or conduit 14 connected to any desired air supply, air being introduced interiorly of the tubing to support the same. Such conduit or the air supply leading to it may be provided with a double reduction valve (not shown) to maintain the desired flow of air in the volume and pressure sought, the current of air passing out through vent 15 in the die. Adjustment of the valve may be utilized to compensate for loss of air by leakage or otherwise.

The thermoplastic tubing 13 is desirably drawn downwardly and passes exteriorly over the temperature modifying cooler 16. Usually the fomer 16 will be supplied with a temperature controlling medium circulated therein which for most purposes will be a cooling medium. To supply the temperature controlling medium to the former 16, an inlet pipe 17 and outlet pipe 18 extending through the die 11 may be provided, these pipes leading to the former 16. Desirably a baffle 19 interiorly of the former 16 is provided to distribute the temperature controlling medium within the former 16. The pipes 17 and 18 may be used to position the former at the desired distance from the die.

The cooling of the thermoplastic as it passes over the former sets the expanded thermoplastic tubing at the predetermined point for example at the diameter of the bottom of the former 16. Thereafter, the tubing which passes through the atmosphere of the room in which the apparatus is located, is not subjected to any further expansion during the remainder of its travel.

The tubing 13 is drawn from the die 11 desirably in a substantially vertical direction over the former 16. And thence over a spreader 20 which collapses the tubing into a flattened sheet or ribbon-like material by means of rotating pull rolls 21 and 22, these rolls also serving to eliminate any air bubbles in the then flattened tubing. The flattened tubing designated 23 leaves the spreader 20 in a flat ribbon-like form and contacts the first of the rotating rolls namely pull roll 22 at a point approximately at the center of such roll and thereby maintains contact with this roll for over one-half of its circumference. The flattened tubing passing between the pull rolls 21 and 22 is evacuated of any air bubbles and entrained air and delivered to rewind rolls 24 and 25 which latter may be driven in any desired way as by a Graham variable drive (not shown). The flattened ribbon-like material contacts the surfaces of the rolls and of the core 26 on which it is wound up, so that there is substantially continuous successive surface contact of the ribbon-like material with the several rolls and the core from the time that the ribbon-like material leaves the spreader until it is wound up on the core. By such continuous successive surface contact, the ribbon is maintained at all times in unrelaxed and unwrinkled condition. In this way the ribbon-like material or sheet material is never permitted to be unsupported or suspended in air so that there is no opportunity for it to relax and to wrinkle. The core 26 for the wind-up of the tubing need be supported only at each end to eliminate side sway.

The supporting gaseous medium which is introduced through conduit 14 and vented at 15, may desirably be air introduced in continuous volume and pressure as may be necessary to support the tubing while in the formative mastic state during its progress to and over the former. Once the amount as to volume and pressure of air has been established, the valves may remain set in a given position. While the tubing is being supported and passed exteriorly over the former 16, heat transfer takes place on substantially the entire interior surface of the tubing during its exposure to the surface of the former. The quantity of coolant in the former 16 the temperature thereof and its pressure, are such that the thermoplastic material is converted from the formative mastic state to a set condition at a time when the tubing has reached a predetermined desired diameter and which in FIGURE 1 is in the neighborhood of the bottom of the former 16.

As illustrated in FIGURE 1, the former 16 is positioned relatively close to the die 11 reaching the desired pre-determined diameter from the formative mastic state to the set state, quickly. After the final diameter has been obtained, the thermoplastic of the tubing is in set condition and there is no further change in diameter. Thus it is preferred to obtain the expansion of the tubing to the predetermined desired diameter in the vicinity of the die, the invention is not restricted thereto. The cooling former 16 may be moved into any position between the pull rolls 21 and 22, and the die 11. Depending on such position will determine the length of draw which is possible. By increasing such distance, the tubing will be capable of a longer draw in the machine direction thereby enhancing its physical properties in that direction. The tubing will thus be capable of further drawing because of the longer time element and distance while in the formative mastic state. Since the tubing is being drawn by the pull rolls 21 and 22, it is also acquiring a machine-direction linear expansion as it is being pulled forward, the film becoming thinner and thinner as it is drawn toward the former 16. The film thus reaches the least (and final) thickness just on contacting the former 16. The result is that the former 16 determines the final diameter of the plastic tube when it reaches that point where it is thinnest.

The quantity of temperature modifying medium such as cooling water which is introduced into the former 16 depends on the position of such former between the die and the pull rolls. The variables controlling these considerations include Speed of downward travel of the extruded tubing;
Temperature of coolant;
Room temperature;
Temperature of extruded material;
Specific heat of the thermoplastic;
Die orifice.

From these considerations it is apparent that various factors including the internal air pressure and volume, volume of coolant introduced into the former, the temperature of the die, the speed of the pull rolls, etc., may all be balanced against each other to produce tubing and sheeting of predetermined characteristics.

As shown in FIGURE 3, the former 16 may be supported by adjustable rods 27, 28 thread seated at one end in the die 11 spaced from pipes 17 and 18 for balance, free to move up and down. The spreader 20 may be attached to a flange 29 held on the bottom of former 16.

As shown in FIGURE 5, the pipes 17 and 18 may pass through channels 30, 31 in die 11, collars 32, 33 being secured to the die 11. Set screws 33 may be tightened in collars 32, 33. The former 16 will thus be maintained in its adjusted position to fix the distance of the former from the die.

Figure 6:
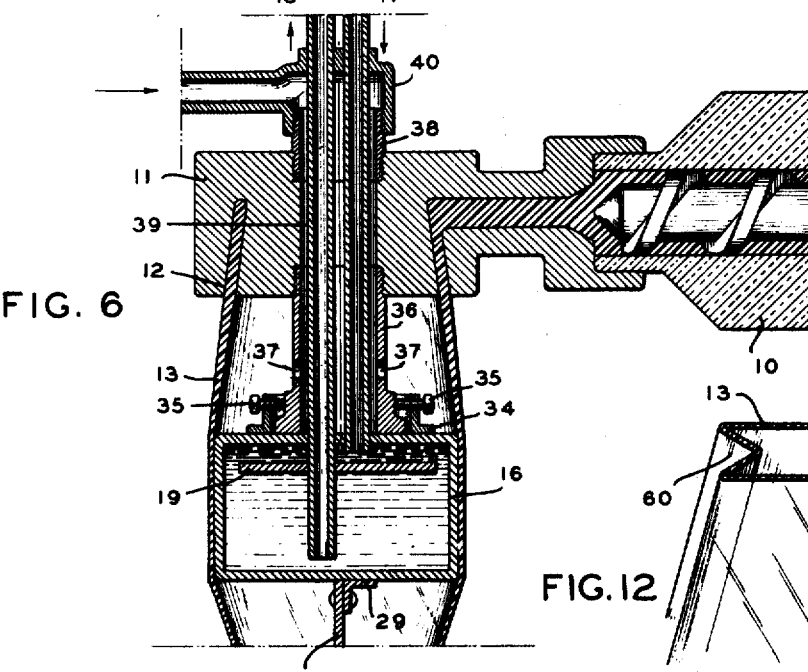

In the modification shown in FIGURE 6, the former 16 has a collar 34 attached thereto in which set screws 35 hold the former in position on the conduit 36. The latter is seated in the bottom portion of the die 11. The conduit 36 forms part of the air inlet to admit air within the extruded tube 13 and for that purpose has openings 37 communicating between the conduit and the space between conduit 36 and extrusion 13. A nipple 38 is attached to the upper portion of die 11 so that nipple 38, channel 39 in the die 11, and conduit 36 form a continuous passage. The outer end of nipple 38 is threaded to receive T 40 through which air or other fluid may be admitted to pass through nipple 38, channel 39 and conduit 36 into the extruded tubing. The temperature controlling fluid which is introduced into former 16 is admitted to the former 16 through inlet pipe 17 and is removed from the former 16 by exit pipe 18, the pipes 17 and 18 passing through conduit 36, channel 39 and nipple 40 for this purpose. A stuffing box (not shown) or other means may be provided where pipes 17 and 18 pass out T 40 to prevent leakage. The pipes 17 and 18 may be welded to the former 16 or otherwise attached thereto.

The following examples will illustrate the invention.

*Example 1*

This illustrates the production of tubing 7″ in flat width and 0.002″ in (wall) thickness, whose tensile strength in the machine direction is approximately equal to its tensile strength in the transverse direction, and whose tear resistance in the machine direction is approximately equal to its tear resistance in the transverse direction.

Molten polyvinyl chloride compound was extruded in an apparatus shown in FIGURE 1 at the rate of 12 pounds per hour through a die having an annular orifice of 0.030″ and 4″ in diameter (between the outer lips thereof), the temperature of the vinyl chloride at the lips being 330–350° F. The extruded tubing was withdrawn downward in a vertical direction from the die at a rate of 15 feet per minute by the pull rolls positioned 2 feet below the die. Sufficient air necessary to support and separate the tubing while in the formative mastic state to feed the tubing to the cooling former of a fixed diameter of 4½″, to produce a final tube diameter of 4¼″ which, upon flattening, will produce a flat width of 7″, was continuously introduced internally of the tubing through the air inlet 14 and vented through vent 15. The tubing was drawn over the former 16 of fixed diameter with a 0.040″ taper, the former being in close proximity to the die approximately a distance equal to the diameter of th former 16. The tubing was chilled and set as it was drawn over the former 16 which thus prevented further expansion of the tube. The tubing which was drawn to its ultimate diameter as it was drawn over the former edge reached its final diameter before leaving the former.

After the tubing had passed the cooling former, it passed through an unconfined circumambient atmosphere which, in this example was the atmosphere of the room, over the spreader to the pull rolls and rewind.

*Example 2*

This example illustrates production of a tubing 7″ in flat width and 0.002″ in (wall) thickness whose tensile strength in the machine direction is higher than the tensile strength in the transverse direction and whose tear resistance in the transverse direction is greater than its tear strength in the machine direction.

The procedure and condition are the same as those described in Example 1, except that temperature of the coolant in the former was higher, obtained by decreasing the flow of the coolant.

The higher temperature of the cooling former did not wholly set the extruded tubing but only a part (surface only) thereof. Thus, the tubing was still in the formative plastic state and capable of further drawing even though some cooling had taken place.

All things being equal, a tubing in the formative plastic state tends to be drawn if restricted by flow at any point. As the tubing was being drawn by the pull rolls, it was acquiring a machine direction linear expansion, the film becoming thinner and thinner as it was drawn over the cooling former until it reached a setting point of cooling near the bottom of the former 16. The film reached its least (and final) thickness just before leaving the contact with the spreader, the diameter being predetermined.

*Example 3*

This example illustrates production of a tubing 7″ in flat width and a 0.002″ (wall) thickness whose tensile strength in the machine direction is higher than the tensile strength in the transverse direction and whose tear resistance in the transverse direction is greater than the tear resistance in machine direction.

The procedure and condition are the same as those described in Example 1, except the former 16 has been moved a greater distance below the die permitting a longer drawing period in the machine direction than was obtainable in Example 1.

The volume and pressure of circulating air inside the tubing can be used to partially set the plastic tube which is in the formative mastic state. Since the draw on the tube is downward, the greater tensile strength will result as the final predetermined diameter will not be reached until the tubing is passed over the cooling former 16. Therefore the greater length of time of draw of the tubing in the formative mastic state is in the machine direction and the expansion transverse a relative small period of time to draw out to its predetermined diameter, giving a film structure of greater tensile strength in the machine direction and greater tear resistance in the transverse direction.

*Example 4*

This example illustrates the production of a tubing 18″ in flat width and 0.002″ in (wall) thickness whose tensile strength in the transverse direction is greater than its tensile strength in the machine direction and whose tear resistance in the machine direction is greater than its tear resistance in the transverse direction.

The procedure and conditions are the same as those described in Example 1, except that the cooling former 16 had a diameter of 10¼″ to give a predetermined tube diameter of 18″.

It is apparent that this procedure is substantially the method of Example 1 in all particulars except that, due to the utilization of a larger cooling former, the tubing is drawn in the transverse direction to a greater degree whereby the desired properties are obtained.

*Example 5*

This example illustrates the production of tubing 7″ in flat width and 0.001″ in (wall) thickness, whose tensite strength in the machine direction is greater than the tensile strength in the transverse direction, and whose tear resistance in the transverse direction is greater than its tear resistance in the machine direction.

Molten cellulose acetate compound was extruded in an apparatus as shown in FIGURE 1 at the rate of 15 pounds per hour through a die having an annular orifice of 0.030" and 4" in diameter (between the outer lips thereof), the temperature of the cellulose acetate at the lips being 330°–380° F. The extruded tubing was withdrawn downward in a vertical direction from the die at the rate of 29.7' per minute by the pull rolls positioned 2' below the die. Sufficient air necessary to support and separate the tubing while in the formative mastic state to feed the tubing to the cooling conductive former of a fixed diameter of 4½", to produce a final tube diameter of 4¼" which, upon flattening, will produce flat width of 7", was continuously introduced internally of the tubing through air inlet 14 and vented through vent 15, the tubing was drawn over the coupling former 16 of fixed diameter, with a 0.020" taper, which was positioned in close proximity to the die approximately a distance slightly greater than the diameter of the cooling former 16. The tubing was chilled and set as it was drawn over the former 16 which thus prevented further expansion of the tube. The tubing which was drawn to its ultimate diameter as it was drawn over the former edge, reached its final diameter before leaving the former 16. After the tubing had passed over the former, it passed through air unconfined circumambient atmosphere which, in this example was the atmosphere of the room, over the spreader to the pull rolls, through the pull rolls, and rewind.

The pressure of the air transmitted through the interior of the plastic tube during the formative mastic state is relatively minor being in the nature of less than 1#/square inch, gauge pressure. In practice, compressed air is supplied to the air channel in the die from a suitable source of supply where it is maintained under a pressure higher than that required at the die channel (e.g. 80#/square inch gauge) which pressure is reduced and regulated by conventional pressure regulator to supply the air at the die channel at the desired pressure.

It is to be noted that in the conventional methods of extrusion for the production of plastic tubing static is a problem. Since the plastic materials are all insulators, it is a problem to remove the static from within the tube itself. By using a former having electrical conducting properties and a grounded water system the static from within the tube is effectively removed. This is of fundamental importance in the final utilization of the tubing, particularly in very thin gauges, since it is practically impossible to open a tube carrying static, for the insertion of the product to be packed because the static will hold the two walls of the tube together.

It is also to be noted that some of the thermoplastic materials are translucent if cooled slowly but become more effectively transparent if cooled rapidly. Polythene is one of these materials so affected. The present invention utilizes the rapid heat transfer of metals for the conductive former to carry away the heat transferred from the tubing to the metal to produce clarity. By using refrigerated water in one conductive cooling former 16, transparency is greatly increased. The prior art method of expanding tubing by blowing (also termed a static head of air) and cooling by air blown on the outside surface, does not permit the transparency obtained by the present invention.

One of the greatest problems of extruded tubing, is volatile matter inside the tubing. As is well known, most of the softeners and modifiers used to compound the organic thermoplastic resins to permit ease of extrusion and to give more useful and more tough and flexible products, are commonly known plasticizers; such as natural oils e.g. castor, soybean and cottonseed oils and their modified forms; chemical plasticizers like tricresyl phosphate, dibutyl phthalate, dioctyl phthalate, etc. As expected, some of these materials have lower boiling points than those temperatures necessary to extrude the plastic into the formative mastic state. Since these volatile materials will condense inside the tubing, under prior art methods of extrusion, they become a problem of blocking and like static this property is undesirable as it causes difficulty in the opening of the tube for use. The present invention, by using a continuous circulating stream of air, permits the removal of the fumes of the volatile plasticizers or lubricants and thereby eliminates the problem of over-plasticized internal surface structure causing sticking and blocking.

Though the specific examples describe the invention in connection with the production of seamless tubing of predetermined desired characteristics from polyvinyl chloride, it is to be understood that the invention is not restricted thereto. In general, the invention can be utilized with any thermoplastic material and mixture of synthetic rubbers with thermoplastic materials. Each thermoplastic substance or composition possesses certain properties which may make it necessary to determine, by experiment, the extent that the variables have to be balanced in order to produce tubing of the desired character. This may be especially so with regard to the quantity cooling water and the volume of supporting air, since the temperature at the lips of the die may be different with different thermoplastic substances or compositions. Also the gauges (weight of the material to be supported) and its apparent resistance or cohesion will help to decide the air pressure needed. Hereinafter, is set forth illustrative thermoplastic materials which can be used in this invention, illustrative temperatures of the melt at the lips of the die being given as well as their thermal contraction:

| Material | Temperature of Melt at the Die Lips, °F. | Mold Shrinkage (SPI Handbook) |
| --- | --- | --- |
| Cellulose Acetate Butyrate | 220–380 | 0.003–0.009 |
| Cellulose Acetate (low Acetal) | 330–380 | 0.004–0.008 |
| Cellulose Acetate (high Acetal) | 450–550 | |
| Ethyl Cellulose | 400–420 | 0.004–0.008 |
| Methyl Methacrylate Polymer | 460–490 | 0.001–0.005 |
| Nylon (extrusion and Molding Grade) | 480–520 | 0.001– |
| Polystyrene | 450–490 | 0.002–0.008 |
| Polyvinyl Formal-acetate butyral | 300–340 | |
| Copolymers of vinyl chloride and vinyl acetate "Vinylite" | 270–370 | 0.002–0.010 |
| Polyvinyl chloride ("Geon," "Ultron") | 270–370 | 0.015–0.017 |
| Vinylidene chloride ("Saran") | 340–370 | 0.004–0.012 |

Though the results can be obtained when the temperature of the thermoplastic at the lips of the die is as given above, the temperature at the lips can be much higher and also lower than the figures given. The maximum temperature used will depend upon the thermoplastic being used, its stability to overheating, the length of time it is subjected to the high heat and its decomposition temperature.

The properties and stability of the thermoplasic substances can be modified as by incorporating therein suitable modifying agents, such as plasticizers, fillers, coloring agents, heat decomposition inhibitors, anti-oxidants, light stabilizers, etc.

The former is desirably constructed of a baffled conductive material such as stainless steel or copper, but is not restricted to them, and is desirably cooled by passing a coolant into and through it. The coolant can be any material capable of absorbing heat from the walls of the former and carrying this heat away with it as it is discharged from the former. For the purpose of test runs, water was used as it is cheap and available. The plastic tubing passing externally over the former will be cooled from the formative mastic state to a set condition. In order to accommodate the shrinkage which is brought about by the cooling action, the former is tapered from the top to the bottom, the bottom diameter being the desired predetermined diameter of the tubing. Since each thermoplastic material has an individual shrinkage factor, as well as other distinguishing factors which effect its drawing over the former, the taper of the former is predetermined for each material. In order to indicate that this shrinkage factor exists, a list of the published mold shrinkages of each thermoplastic has been given above.

The former position can be moved to a predetermined position, all depending upon the results desired from a predetermined thermoplastic and the desired predetermined diameter. The former position may be utilized very close to the die, even becoming a part thereof and being constructed therein as a part thereof.

The height of the former is not restricted to any dimension and may be constructed as small as a cooling coil. One or more formers may be used in series to obtain greater orientation and the temperatures in the formers may vary as desired. Thus a first former may be used at a somewhat higher (warmer) temperature than a second former and their diameters varied as desired. The last former will be the cold one, preceding formers not being cold enough to set the plastic. The length of the cooling former surface is determined by the nature of the material, the temperature of the material in the formative mastic state, the gauge, the speed, and whether it is desirable to draw above the former, on the former or below the former. This is determined by the required physical properties desired in the finished tubing, all of which are predetermined to produce a tubing with the required physical properties and the desired predetermined diameter. The cooling former gives a positive metering action on the tubing and being of positive nature as to diameter and support, permits the production of very fine gauge tubing and sheeting with excellent predetermined tolerance and desired diameter. Polythene has been produced at a 0.000125" and vinyl chloride at 0.00025". These very fine tolerance gauge materials are the result of definite support, metering and controlled cooling obtained by the use of the temperature controlling former. The prior art method of using air pressure, without any positive support of the tubing walls, is not conductive to the production of low gauge or accuracy because, the formative plastic tubing will, tend to expand most easily at its thinnest point. Since by today's common standards, machining and heat controls are not accurate enough, the extruded tubing tends to have thin spots or overheated points, both of which will react the same under constant pressure, over-expansion of the tubing at those points will result which may blow-out, leaving holes, thus causing a loss of the head air. A complete collapse of the tube may result. This invention eliminates these difficulties because the film is supported and the air used is not for the expansion of the tube, but just as an assist in supporting the tubing as well as a partial coolant therefor and for the condensing of the volatile materials.

Likewise prior art methods of expanding the formative plastic tube by the use of a standing head of air have difficulty in maintaining a straight walled tube because of two factors: the first is mentioned above in reference to non-uniformity of wall thickness because of imperfect die machining and poor distribution of heat, resulting in thin spots that may expand further than expected; the second is the blow-out of the thin walled sections causing air loss or leakage. Small pin holes may also affect the prior art methods causing a variation in the desired diameter of the tubing. Therefore any loss of air, regardless of the amount, in the prior art method of blowing or expanding the tubing while in the formative mastic state will decrease the diameter of the tubing; and since the air column is static, new air must be added to bring the air head back to its original amount before the desired predetermined diameter can be obtained.

My invention eliminates the hazards caused by the fixed column of air. The tubing while in the formative mastic state is supported by the air flow between the die and the cooling can. The tubing is supported while being drawn over the can; the tubing is supported and flattened by the spreader when in the set condition after which time no further expansion can take place. Since a continuous predetermined flow of air is established, the collapse of the tube never occurs. Regardless of pin-holes or blow-outs, my invention will provide a tube of the desired predetermined diameter. Also, no change is necessary in the air-flow after the valve setting has been determined.

The spreader is of predetermined width and is correlated to the predetermined diameter of the cooling former in accordance with the desired predetermined diameter of the tubing.

The spreader may be a flat tapered object with a predetermined bottom width or may be constructed in many ways to accomplish the same purpose. It may be a hollow cone; a structure formed from a metal tubing or framework and it may be rigid or spring loaded. Another feature not shown is of having a control, to expand or contract its width, which would originate above the die and go through the die in the air channel and proceed through the cooling former. Minute adjustments could then be made while the process is in operation or with large changes available the spreader could be used for more than one size cooling former.

The main object of the spreader is to deflate the tubing to a flat ribbonlike structure, without wrinkles or trapped air, feeding the flat ribbon uniformly and accurately to the pull rolls which in turn feed the rewind rolls. The flattened tubing after leaving the spreader never loses contact with the pull rolls or the rewind rolls.

Because of the accuracy of the desired predetermined diameter of the tubing, which may be slit between the cooling former and the end of the spreader, the finished slit sheets or sheeting is predetermined and involves no trim, thereby maintaining an accuracy not herein before possible whether single sheets or multiples were made. Another feature of the spreader is that it can be so designed so that the tubing coming off the cooling former, the tubing being in the set state, may be gusseted. This is accomplished by structural changes in the spreader to accommodate the shape the tubing is to be given. The spreader may be of any shape; square, oval or any shape, regular or irregular, as long as the perimeter of such shape is equal to the perimeter of the flat spreader of predetermined width. The spreader may also be constructed so that it will be a multiple of the predetermined width, and additional assisting blades, rollers or other contrivances on the outside of the tubing to deflect the tubing into the apertures of the multiple widths.

Figure 7:
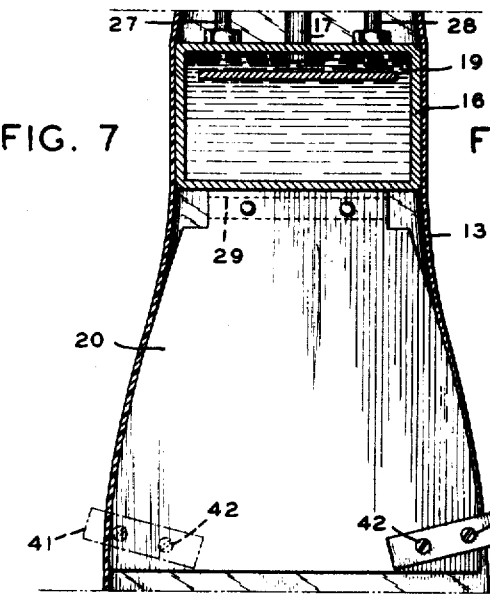
Figure 8:
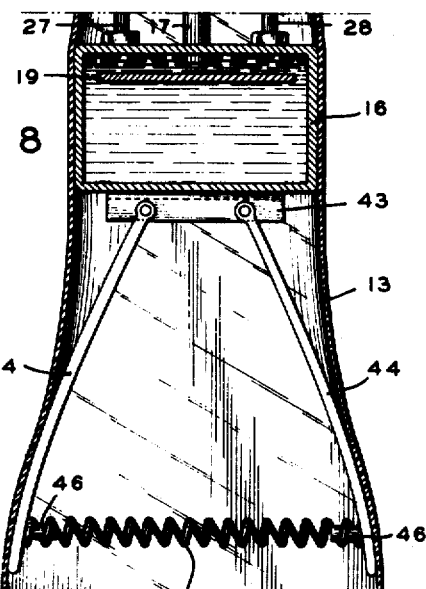
Figure 9:
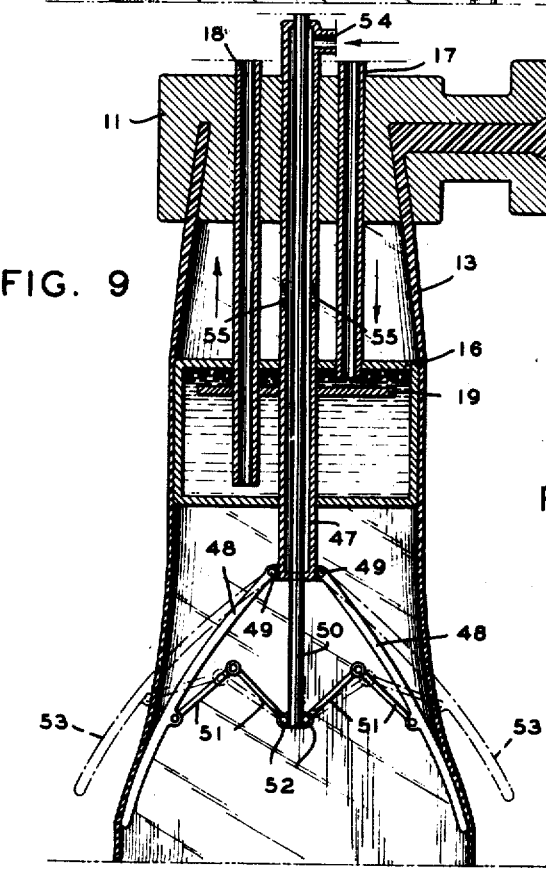

Variations of the stated character in the spreader are illustrated in FIGURES 7 to 9. Referring to FIGURE 7, the extruded tubing 13 passes from the former 16 over spreader 20 in the form of a substantially flat member having arcuate edges, the member increasing in width. At the lower end of the spreader, knives 41, 41 may be held on spreader by bolts 42 to slit the extruded tubing. The contour of the spreader may take any desired form. The knives may be placed at any point and may be mounted exteriorly of the extruded tubing instead of being carried on the spreader. Such knives may be used with any desired form of spreader herein or of other type.

In the modification shown in FIGURE 8, the flange 43 welded or otherwise attached to former 16 has spreader arms 44, 44 pivotally mounted thereon the ends of which arms are urged outwardly by spring 45 seated at each end on a lug 46 on each spreader arm. The spreader arms may be mounted as shown or may cross each other. The arms may be rigidly held in position or may be spring-loaded.

In the modification shown in FIGURE 9, an expandable and adjustable spreader is shown. In this structure pipe 47 extends below the former 16 and spreader arms 48, 48 are pivotally mounted thereon at 49, 49. A plunger 50 is adapted to reciprocate in pipe 47, the end of plunger 50 having the inner of each pair of links 51, 51 pivotally attached thereto at 52 while each outer link is pivotally attached to a spreader arm 48. The spreader arms may be expanded to position shown in dotted lines at 53 or retracted, by movement of plunger 50 so that the spreader may be given any position desired. Set screws, frictional contact, or any other desired means (not shown) may be used for holding the arms in any set position once the predetermined setting has been fixed. But it may be simply varied from time to time to adjust the spreader to any desired position. If desired, pipe 47 may serve as the inlet for air or other fluid through inlet 54, openings 55 being provided for permitting entry of air from pipe 47 into the space within the extruded tubing 13 between former 16 and dye 11. Plunger 50 may be a pipe to permit exit of air or other fluid from within the tubing below the former 16.

Figure 12:
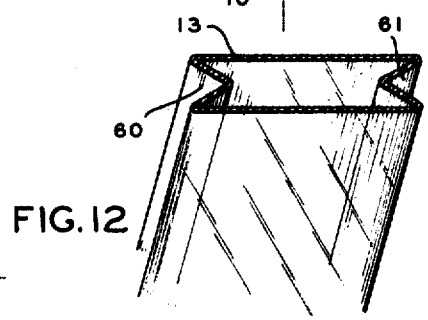
Figure 10:
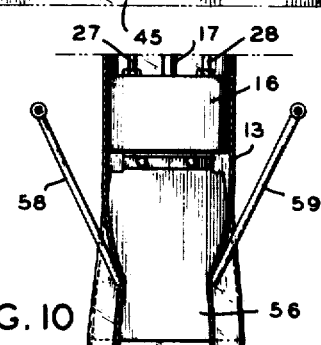
Figure 11:
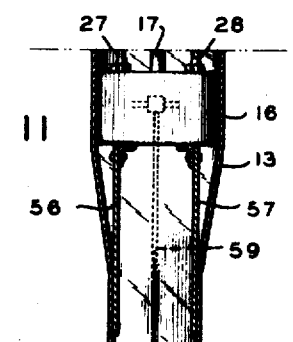

FIGURES 10 and 11 illustrate a multiple spreader with gusseting arms. As shown, the former 16 may have a pair of substantially parallel spreaders 56 and 57 carried thereon spaced apart at any desired distance. A pair of gusseting arms 58, 59 may be attached on any support or framework to extend into the path of the tubing 13 and engage against the latter to produce a fold or gusset on opposite sides of the tubing. The resulting product is illustrated in FIGURE 12, in somewhat expanded condition, the gussets 60, 61 being shown. The depth of the gusset may be made of any desired degree subject only to the consideration that the perimeter of the gusseted tubing must equal the perimeter of the tubing prior to gusseting.

In the examples, the volume and pressure of the internally supporting and separating air, the volume and temperature of the coolant in the former, the diameter of the cooling former, the diameter of the die, and the width and length of the spreader, are balanced against each other to produce tubing of the predetermined desired characteristics while all the other conditions, such as, for example screw speed, temperature of extrusion, speed of rotating rolls, room temperature, width of die orifice, etc. are maintained constant. Obviously, if one or more of the conditions which is maintained constant in the examples is varied, the volume or pressure of the supporting and separating air, the diameter of the former, the diameter of the die, would have to be further balanced to compensate to accommodate for such variations. Such determinations of the necessary conditions may in accordance with the teachings of the instant invention, be determined by simple experiment. In general, however since in any apparatus, certain features may be maintained constant, the four variables (internal suporting and separating air volume, cooling former diameter, diameter of the die, and the pull roll speed) are the most easily varied and controlled.

One of the features of this invention is the ease of producing various gauges of a thermoplastic compound of a desired predetermined diameter. When all the conditions for the proper production are accomplished, such as extrusion speed and temperatures, die temperatures, internal supporting and separating air volume and pressure, cooling former diameter and the spreader width, the gauge of the tubing of the desired predetermined diameter and physical properties can be varied by increasing or decreasing the speed of the pull rolls. The faster the speed, the lower the gauge and the slower the speed the higher the gauge.

The invention has been described in connection with a supporting and separating gaseous medium such as air. Since air is relatively cheap and available, it is preferred. However, any other gaseous medium which does not exert any deleterious effect upon the tubing being produced may be used.

In the invention, as herein before specifically described, water constituted the cooling medium for the cooling former. While tap water at 50° to 60° was generally used, and refrigerated water also used, because it was cheap and available, any other coolant whether liquid or gaseous may be used. It is possible that under certain conditions a coolant may be required at a higher temperature than normally supplied by commercial means. Therefore this invention is not limited in that respect and may provide a means for heating the coolant such as a hot water heater. In certain respects the lowering of the baffle inside the cooling former, a slower movement of the coolant, or a reversal of the flow of the coolant through the cooling former, will accomplish the desired higher temperature.

The invention herein described is particularly suitable for the production of very thin walled continuous walled tubing or sheeting. Though, as shown by the examples, tubing having a wall thickness of 0.002" may be produced, tubing having a wall thickness as low as 0.000125" and as high as 0.020" has also been produced.

In general the width of the die orifice is not material. It should be of a width to provide the molten material in sufficient amount to produce the predetermined sized tubing. A relationship between the die orifice diameter and the former diameter as great as 1:5 may be used, but the former diameter may also be smaller than the die orifice diameter.

The diameter of the die between the lips thereof is such that tubing in the formative mastic state may be drawn over the former of predetermined diameter.

Though the method has been herein described in connection with drawing the extruded tubing while in the formative mastic state to a diameter greater than the diameter of the die, the invention is not restricted thereo. The method may be utilized in the production of tubing of predetermined characteristics and of a diameter less than the diameter of the die. This may be obtained by utilizing a cooling former and a spreader of smaller diameter and width than the diameter of the die and increasing the speed of the pull rolls.

In the preferred embodiment of the invention, the tubing is extruded in a downward direction. Though this is the preferred embodiment, the principles of the invention can also be utilized for extruding horizontally, vertically upward or at any angle.

The invention provides a method whereby tubing of predetermined desired size, gauge, and physical characteristics may be obtained by appropriately controlling and regulating the variables in the process. Since in most of the apparatus most of the conditions may be maintained constant, the desired results may be obtained if all the conditions are maintained except the temperature of the cooling water, the diameter of the cooling former and the diameter of the die, and the width of the spreader, and such variables are balanced against each other while the other conditions are maintained constant as is necessary to produce the predetermined desired results.

All thermoplastics may be utilized in the present extrusion process. Polyethylene is relatively easy to extrude but vinyl and other plastics may be handled readily. Advantages of the present process over other known extrusion processes include:

(a) Air is blown in continuously and vented by its own pressure or received by a pump to move volatiles which cause tackiness and discoloration.

(b) To get constant dimension, the tube is supported throughout the process, the former acting as a metering device as well as for cooling.

(c) The former may be made electrically conducting to remove static thereby aiding later opening the tubing for packaging.

(d) Heat may be removed by a metal conductive former which is more rapid than prior art methods of air or water cooling, the latter presenting a problem of having a wet surface.

(e) The exactness of dimensions of the tubing permits slit sheeting to be produced without trimming or waste, all in one operation.

(f) Mechanics of spreader and rewind, permit rolls of any diameter to be produced without wrinkles or air bubbles and stretching.

(g) Lower gauges of tubing and film may be readily produced as the expansion of the tubing is positive with equal pressure on the entire inner surface of the tubing giving an equal transverse stretch, thereby removing the prior art difficulties resulting from excess blowing and stretching giving a relative thin wall or one spot slightly hotter than the rest of the tubing.

The products produced from the instant method may have lower gauge with good or better physical properties and may be made transparent, translucent or opaque as desired. Tears, holes, loss of air, etc., do not affect the continuous operation of the instant process whereas in the prior art they will cause a collapse of the tubing, pulsation giving varying widths, and loss of time due to starting all over again each time this occurs.

This process is simple and as far as I have ascertained is fool-proof in its operation.

The wind-up method and apparatus described above have given satisfactory results in use in producing a roll of thin-walled flat thermoplastic such as sheet, strip or flattened tubing, having a wall thickness which shows a tendency to wrinkle on wind-up. A roll free from wrinkle or other defect is obtained. For that purpose as explained above, the continuous flat thin-walled thermoplastic product is produced, and wound up at a distance from the point of production, the product being physically supported continuously between production and wind-up while under tension. In this way there is no opportunity for the product to relax and wrinkle during wind-up.

The wind-up operation as illustrated above includes pull rolls around which the flattened product is drawn and delivered to rewind rolls, and at all times the flattened product is physically supported under tension between production and wind-up.

There are times when it is desirable to carry out the wind-up under conditions where the thermoplastic is warmed or heated but at a temperature at which it is still solid and does not stick during supporting and wind-up operations. The completed roll must exhibit sufficient "slip" so that the product may be readily unwound. The temperatures employed will necessarily vary to some extent at least with the thermoplastic, the formulation (more rigid formulations permit generally higher temperatures), gauge, the nature of the rolls, and other factors. In general the temperature will lie between 180 and 220° F. depending on the thermoplastic etc., but will always be below the melting point and below any point causing difficulty from adhesion, either with equipment, or lack of "slip." In one view the operation may be likened to a sort of ironing operation wherein surface irregularities are avoided or ironed out. But the product cannot deform because it is physically supported at all times.

As indicative of preferred temperatures for certain thermoplastics the following are noted: for polyethylene, polyvinyl, and vinyl copolymers usually in the range of from about 180 to 200° F.; for cellulose acetate about 200 to 220° F.; for regenerated cellulose about 212 to 500° F. In controlling temperatures, a train of rolls of any desired number may be used, and they may be temperature controlled as by heating or cooling elements. Alternating heating and cooling rolls may be employed and heating rolls need not all be at the same temperature, nor need all cooling rolls, since variation in surface effect may be employed. The following equipment will illustrate the method and apparatus utilizable for these purposes.

Figure 13:
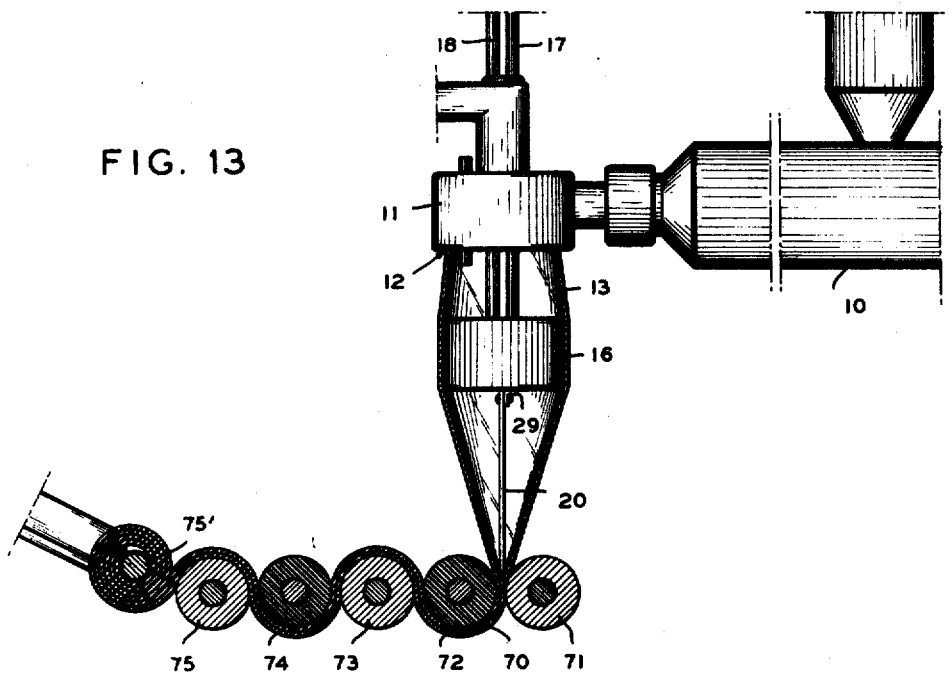
FIGURE 13 is an elevation of a modified form of wind-up mechanism.
Figure 14:
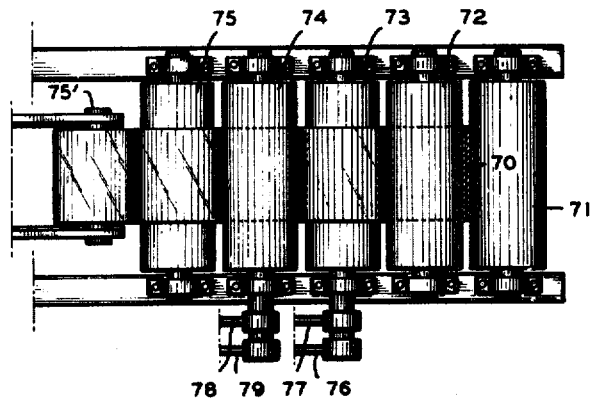
FIGURE 14 is a plan view thereof.

Extruded tubing 13 from extruder 10 (FIGURES 13 and 14) through die 11 emerges at orifice 12 as for FIGURE 1 above, passes over former 16 and spreader 20 to form flattened ribbon 70 which passes through the series of rolls shown illustratively as five rolls 71, 72, 73, 74 and 75, emerging under dancer roll 76 to a rewind roll (not shown) similar to 25 in FIGURE 1. Such rolls may be made of any desired material such as metal or rubber. As shown rolls 71, 73 and 74 are metal and rolls 72 and 75 rubber. Rolls 73 and 74 are hollow and provided with connections 76 and 77 respectively for introduction of a heating fluid into roll 73 and removal therefrom; while connections 78 and 79 control introduction and removal of a cooling medium in roll 74. Electrical heating means can be used if desired.

Any desired heating and cooling may be arranged to maintain temperatures of the order set forth above.

By these procedures it is possible to produce rolls of flat thermoplastic products, wound as desired. A roll of extruded thin-walled flat polyvinyl thermoplastic having a wall thickness of not more than several mils and in unwrinkled condition may be readily produced.

Since the present process produces tubing to the rewind or pinch rolls in a flat and unwrinkled condition, the fact that it is continuously supported throughout the rewind is important.

In the manufacture of film and tubing one must of course pull the material at some point, generally by the pinch rolls. Therefore, since the thermoplastic materials all have some elongation and recovery, like a rubber band, or in the case of plastics, memory, and since the speed of manufacture passes the material through the windup completely supported and under tension, this memory or recovery gets its first chance to return to normal in the wound-up roll. In the case of polyethylene there is about a 4% recovery. Film grades of polyvinyl chloride have about a 10% recovery. In the case of polyethylene a soft rolled roll will accommodate the 4% shrinkage. However the strains which cause this memory cannot be accounted for in the case of vinyl and a very hard roll is the result. Even small gauge variations in the film or tubing should be avoided to reduce irregularities in the roll.

Most polyethylenes have a retained strain pattern of 3 to 4% which is relieved and causes shrinkage when the film is treated with gamma rays.

Passage of the film or tubing over the heated roll relieves the strains. The film or tubing produced by the present invention is just the opposite of the shrink wrappings.

I claim:

1. In a method of producing a roll of thermoplastic product by dry extruding in non-self-sustaining condition heated synthetic resinous thermoplastic seamless tubing of a size smaller than that finally desired, passing the extruded tubing over a cooling former of the size and contour desired in the final tubing, maintaining a substantially constant low pressure gaseous medium in the tubing between the points of extrusion and cooling at a pressure to prevent collapse only of the tubing said pressure having no substantial effect in modifying the shape of the tubing and introducing a cooling fluid into said cooling former to set the tubing passing thereover to set condition of size and contour determined by the configuration of the cooling former, the steps of converting said extruded set tubing into a continuous flat think-walled thermoplastic product having a tendency to wrinkle, winding said product into roll at a distance from production of said flat thin-walled product, physically supporting said thin-walled product by substantially continuous surface support at all times so that the extruded thermoplastic is substantially never unsupported in air between production and wind-up while under tension and in unrelaxed and unwrinkled condition whereby the product does not relax and wrinkle, and heating the product during wind-up to a temperature at which it is still solid but does not stick during the supporting and wind-up operations.

2. The method of claim 1 in which the product is polyethylene and the temperature of the product heated during wind-up is between about 180 and 200° F.

3. The method of claim 1 in which the product is polyvinyl and the temperature of the product heated during wind-up is between about 180 and 200° F.

4. The method of claim 1 in which the product is cellulose acetate and the temperature of the product heated during wind-up is between about 200 and 220° F.

5. The method of claim 1 in which the product is alternately heated during wind-up and then cooled to room temperature.

6. In apparatus for producing a roll of thermoplastic product, by an extruder and die for dry extruding heated synthetic resinous thermoplastic seamless tubing in non-self-sustaining condition, the die having an orifice giving tubing of a size smaller than that finally desired and a temperature modifying former to form the tubing to the size and contour desired in said final tubing said former being supported by said die within the extruded tubing, the modifying former sealing the tubing against entry of fluid from within the former, a conduit in said die opening into the extruded tubing to admit a supporting fluid into tubing when being extruded the former being closed to entry of said supporting fluid, and in the said apparatus the means for converting said extruded set tubing into a continuous flat thin-walled thermoplastic having a tendency to wrinkle, a wind-up roll for said product at a distance from the production means for converting said extruded tubing into the flat thin-walled product, a pull roll to pull the product under tension, and rolls for continuously physically supporting said thin-walled product by substantially continuous surface support at all times so that the extruded thermoplastic is substantially never unsupported in air between production and wind-up while under tension in unrelaxed and unwrinkled condition whereby the product does not relax and wrinkle, the rolls including alternating heating and cooling rolls.

7. The method of producing a roll from extruded thin-walled flat thermoplastic product having a tendency to wrinkle which consists essentially in winding said product under tension into a roll and physically supporting the product by substantially continuous surface contact at all times during wind-up while under tension and in unrelaxed and unwrinkled condition whereby the product does not relax and wrinkle and heating the product during wind-up to a temperature at which it is still solid but does not stick during the wind-up operations.

8. The method of claim 7 in which the product is polyethylene and the temperature of the product heated during wind-up is between about 180° and 200° F.

9. The method of claim 7 in which the product is polyvinyl and the temperature of the product heated during wind-up is between about 180 and 200° F.

10. The method of claim 7 in which the product is cellulose acetate and the temperature of the product heated during wind-up is between about 200 and 220° F.

References Cited in the file of this patent

UNITED STATES PATENTS

| | | |
|---|---|---|
| 1,920,118 | Walsh et al. | July 25, 1933 |
| 2,070,600 | Jenett | Feb. 16, 1937 |
| 2,085,532 | Kinsella | June 29, 1937 |
| 2,260,501 | Wynd | Oct. 28, 1941 |
| 2,340,652 | Dwyer | Feb. 1, 1944 |
| 2,448,433 | Irons et al. | Aug. 31, 1948 |
| 2,631,954 | Bright | Mar. 17, 1953 |
| 2,641,022 | Kress | June 9, 1953 |
| 2,763,029 | Tulloss | Sept. 18, 1956 |

FOREIGN PATENTS

| | | |
|---|---|---|
| 307,984 | Italy | May 20, 1933 |

UNITED STATES PATENT OFFICE
CERTIFICATE OF CORRECTION

Patent No. 3,061,875

November 6, 1962

Milo R. Gerow

It is hereby certified that error appears in the above numbered patent requiring correction and that the said Letters Patent should read as corrected below.

Column 1, line 14, for "2,700,680" read -- 2,720,680 --; column 2, line 69, for "shefl" read -- shelf --; column 4, line 71, for "gosecus" read -- gaseous --; column 5, line 10, for "beig" read -- being --; column 9, line 20, for "coupling" read -- cooling --; column 10, line 59, for "thermoplasic" read -- thermoplastic --; column 14, line 34, for "thereo" read -- thereto --; column 16, line 65, for "think-walled" read -- thin-walled --.

Signed and sealed this 2nd day of April 1963.

(SEAL)
Attest:

ESTON G. JOHNSON
Attesting Officer

DAVID L. LADD
Commissioner of Patents